US012113770B2

(12) United States Patent
Pandey et al.

(10) Patent No.: US 12,113,770 B2
(45) Date of Patent: Oct. 8, 2024

(54) DHCP SNOOPING WITH HOST MOBILITY

(71) Applicant: Cisco Technology, Inc., San Jose, CA (US)

(72) Inventors: Manoj Pandey, Milpitas, CA (US); Samir Thoria, Saratoga, CA (US); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/737,607

(22) Filed: Jan. 8, 2020

(65) Prior Publication Data

US 2021/0211404 A1 Jul. 8, 2021

(51) Int. Cl.
*H04L 61/5014* (2022.01)
*H04L 9/40* (2022.01)
(Continued)

(52) U.S. Cl.
CPC ...... *H04L 61/5014* (2022.05); *H04L 12/4641* (2013.01); *H04L 12/66* (2013.01);
(Continued)

(58) Field of Classification Search
CPC . H04L 61/2015; H04L 12/4641; H04L 12/66; H04L 61/103; H04L 61/6022; H04L 63/1466; H04L 12/4633; H04L 12/4625; H04L 2012/4629; H04L 45/44; H04L 45/586; H04L 45/64; H04L 12/462; H04L 12/4675; H04L 2212/00; H04L 29/06; H04L 41/0246; H04L 41/0809; H04L 41/0853; H04L 41/0876; H04L 41/0886;
(Continued)

(56) References Cited

U.S. PATENT DOCUMENTS 9,503,371 B2 * 11/2016 Thakkar .............. H04L 49/3009
9,575,782 B2 * 2/2017 Chandrashekhar ........................
G06F 9/45558
(Continued)

FOREIGN PATENT DOCUMENTS

CN 106357840 A 1/2017
CN 109842692 A 6/2019

OTHER PUBLICATIONS

Kakrania, et al, "EVPN Access Security", Internet Engineering Task Force, Standard Working Draft, Internet Society, Jan. 12, 2017, pp. 1-12.
(Continued)

*Primary Examiner* — Greg C Bengzon
(74) *Attorney, Agent, or Firm* — Lee & Hayes, P.C.

(57) ABSTRACT

This disclosure describes methods of operating a leaf node device, such as a switch device, connected to a switch fabric of a network. The leaf node device receives, from another leaf node device via the switch fabric, an indication of a secure route to a host device. In response to receiving the indication of the secure route, the leaf node device creates or updates a routing entry for the host device in a routing information base of the leaf node device and creates or updates an entry for the host device in a Dynamic Host Configuration Protocol (DHCP) snoop database of the leaf node device. The leaf node may thereby communicate with the host device that is attached to the leaf node device as a result of moving from the other leaf node device.

20 Claims, 6 Drawing Sheets

(51) Int. Cl.
  *H04L 12/46* (2006.01)
  *H04L 12/66* (2006.01)
  *H04L 61/103* (2022.01)
  *H04L 101/622* (2022.01)

(52) U.S. Cl.
  CPC ........ *H04L 61/103* (2013.01); *H04L 63/1466* (2013.01); *H04L 2101/622* (2022.05)

(58) Field of Classification Search
  CPC ....... H04L 41/12; H04L 43/028; H04L 43/04; H04L 45/22; H04L 45/28; H04L 45/50; H04L 45/74; H04L 45/741; H04L 45/745; H04L 45/7453; H04L 49/25; H04L 49/3009; H04L 49/70; H04L 61/2007; H04L 61/203; H04L 61/2046; H04L 61/2053; H04L 61/2061; H04L 63/0227; H04L 63/0876; H04L 63/105; H04L 65/602; H04L 67/02; H04L 67/1097; H04L 63/0428; H04L 63/08; H04L 63/104; H04L 63/1483; H04L 63/164; H04L 63/0272; H04L 63/029; H04L 63/061; H04L 63/0869; H04L 63/0209; G06F 2009/45595; G06F 9/455; G06F 9/44505; G06F 9/45558; H04W 12/00512; H04W 12/06; H04W 84/12

See application file for complete search history.

(56) References Cited

U.S. PATENT DOCUMENTS

| | | | |
|---|---|---|---|
| 9,577,845 B2* | 2/2017 | Thakkar | H04L 45/44 |
| 9,590,824 B1* | 3/2017 | Sikand | H04L 12/4666 |
| 9,768,980 B2* | 9/2017 | Subramaniyam | H04L 12/462 |
| 9,838,310 B1* | 12/2017 | Sajassi | H04L 61/6022 |
| 9,887,960 B2* | 2/2018 | Chanda | H04L 61/2015 |
| 9,923,800 B2* | 3/2018 | Fang | H04L 12/4641 |
| 9,952,885 B2* | 4/2018 | Chanda | G06F 9/455 |
| 10,020,960 B2* | 7/2018 | Wang | H04L 12/4633 |
| 10,257,042 B2* | 4/2019 | Aguayo | H04L 12/4633 |
| 10,382,266 B1* | 8/2019 | Balakrishnan | H04L 61/2007 |
| 10,454,821 B2* | 10/2019 | Filsfils | H04L 45/04 |
| 10,454,984 B2* | 10/2019 | Bicket | H04L 29/06 |
| 10,511,458 B2* | 12/2019 | Subramaniyam | H04L 12/4641 |
| 10,742,557 B1* | 8/2020 | Miriyala | H04L 63/0263 |
| 10,757,020 B2* | 8/2020 | Morris | H04L 45/50 |
| 10,853,127 B2* | 12/2020 | Gao | H04L 45/64 |
| 10,893,022 B1* | 1/2021 | Li | H04L 45/748 |
| 11,388,083 B2* | 7/2022 | Wang | H04L 63/20 |
| 2006/0209851 A1* | 9/2006 | Scudder | H04L 45/308 370/401 |
| 2007/0133577 A1* | 6/2007 | Dong | H04L 12/4641 370/469 |
| 2007/0297349 A1* | 12/2007 | Arkin | H04L 12/66 370/255 |
| 2008/0104046 A1* | 5/2008 | Singla | H04L 63/1408 |
| 2010/0088399 A1* | 4/2010 | Gluck | H04L 63/104 709/221 |
| 2010/0287266 A1* | 11/2010 | Asati | H04L 12/4641 709/222 |
| 2012/0158948 A1* | 6/2012 | Pang | H04L 65/80 709/224 |
| 2013/0117449 A1* | 5/2013 | Hares | H04L 45/04 709/225 |
| 2014/0241247 A1* | 8/2014 | Kempf | H04L 12/4641 370/328 |
| 2015/0016461 A1* | 1/2015 | Qiang | H04L 61/2046 370/392 |
| 2015/0195178 A1* | 7/2015 | Bhattacharya | H04L 45/745 718/1 |
| 2016/0063226 A1* | 3/2016 | Singh | G06F 21/30 726/19 |
| 2016/0134526 A1* | 5/2016 | Maino | G06F 9/5077 709/226 |
| 2016/0226760 A1* | 8/2016 | Liljenstolpe | H04L 45/74 |
| 2016/0277210 A1* | 9/2016 | Lin | H04L 45/66 |
| 2016/0285760 A1* | 9/2016 | Dong | H04L 45/586 |
| 2017/0026233 A1* | 1/2017 | Boutros | H04L 41/12 |
| 2017/0026275 A1* | 1/2017 | Yang | H04L 12/66 |
| 2017/0026288 A1* | 1/2017 | Yang | H04L 45/745 |
| 2017/0093794 A1* | 3/2017 | Natu | H04L 12/4641 |
| 2017/0093834 A1* | 3/2017 | Natu | H04L 12/2852 |
| 2017/0118041 A1* | 4/2017 | Bhattacharya | H04L 41/5054 |
| 2017/0195135 A1* | 7/2017 | Singh | H04L 45/16 |
| 2017/0195220 A1* | 7/2017 | Sivaraj | H04W 48/16 |
| 2017/0207965 A1* | 7/2017 | Kishida | H04L 61/2053 |
| 2017/0264592 A1* | 9/2017 | Yoda | H04L 63/1441 |
| 2017/0317919 A1* | 11/2017 | Fernando | H04L 61/103 |
| 2017/0353430 A1* | 12/2017 | Holtmanns | H04L 63/123 |
| 2017/0373973 A1* | 12/2017 | Bickhart | H04L 45/64 |
| 2018/0007125 A1* | 1/2018 | Onno | G06F 9/5083 |
| 2018/0013674 A1* | 1/2018 | Nainar | H04L 45/32 |
| 2018/0176181 A1* | 6/2018 | Fu | H04L 63/101 |
| 2018/0183753 A1* | 6/2018 | Vemulakonda | H04L 41/0886 |
| 2018/0248803 A1* | 8/2018 | Nagarajan | H04L 12/46 |
| 2018/0302439 A1* | 10/2018 | Hoffmann | H04L 47/12 |
| 2018/0331953 A1* | 11/2018 | Hoang | H04L 45/50 |
| 2019/0034226 A1* | 1/2019 | Gao | G06F 9/4856 |
| 2019/0058709 A1* | 2/2019 | Kempf | H04L 9/3226 |
| 2019/0182145 A1* | 6/2019 | Yan | H04L 12/4633 |
| 2019/0182152 A1* | 6/2019 | Yan | H04L 45/54 |
| 2019/0182249 A1* | 6/2019 | Song | H04L 67/1097 |
| 2019/0288984 A1* | 9/2019 | Hajduczenia | H04L 63/0218 |
| 2019/0296922 A1* | 9/2019 | Dutta | H04L 12/1886 |
| 2019/0296999 A1* | 9/2019 | Dutta | H04L 45/04 |
| 2019/0372886 A1* | 12/2019 | Beck | H04L 45/22 |
| 2020/0007582 A1* | 1/2020 | Dixit | H04L 63/20 |
| 2020/0007584 A1* | 1/2020 | Dixit | H04L 43/08 |
| 2020/0067830 A1* | 2/2020 | Malhotra | G06F 16/2272 |
| 2020/0099610 A1* | 3/2020 | Heron | H04L 45/34 |
| 2020/0136958 A1* | 4/2020 | Kouvelas | H04L 45/28 |
| 2020/0186447 A1* | 6/2020 | Song | H04L 12/4641 |
| 2020/0204517 A1* | 6/2020 | Daun | H04L 12/2801 |
| 2021/0243053 A1* | 8/2021 | Dunbar | H04L 45/64 |

OTHER PUBLICATIONS

The International Preliminary Report on Patentability mailed Jul. 21, 2022 for PCT Application No. PCT/US21/12548, 8 pages.
The PCT Search Report and Written Opinion mailed Mar. 30, 2021 for PCT application No. PCT/US21/12548, 15 pages.

* cited by examiner

DHCP SNOOPING WITH HOST MOBILITY

TECHNICAL FIELD

The present disclosure relates generally to Dynamic Host Configuration Protocol (DHCP) snooping in networks and, more specifically, to a methodology that allows for effective use of DHCP snooping in a network with host device mobility.

BACKGROUND

A common attack on network security is a "man-in-the-middle" attack. In a man-in-the-middle attack, an attacker may masquerade as a trusted host device. By masquerading as the trusted host device, the attacker may be able to nefariously access network resources.

For example, the masquerading host device may direct an Address Resolution Protocol (ARP) packet to a switch device, attempting to trick the switch device into accepting the masquerading host device as a valid host device in the network. If the masquerading host device is accepted as a valid host device, then the masquerading host device may maliciously attack or otherwise negatively affect other devices on the network.

As another example, a masquerading host device may attempt to use the IP address of another host device to send traffic over a network. If the masquerading host device is allowed to send traffic over the network, the masquerading host device may negatively affect other devices on the network.

One method to defend against a man-in-the-middle attack is for a leaf node device, such as a switch device, to verify an Internet Protocol (IP) to Media Access Control (MAC) pairing of a host device by snooping on DHCP requests made by the host device and/or DHCP responses made to the host device. The verified IP to MAC pairing may then be used by the leaf node device to update or maintain an entry in a DHCP snoop database of the leaf node device. The leaf node device may then utilize one or more DHCP snoop database entries to validate traffic on the network, such as ARP messages and other traffic originating from a host device.

However, the ability of a host device to move from one leaf node device to another can increase the challenge for a network to verify the IP to MAC pairing and, thus, increase the challenge to defend against man-in-the-middle attacks. That is, the host device may communicate over the network from the other leaf node device without the other leaf node device having an entry in its DHCP snoop database that the other leaf node device may use to validate traffic originating from the host device. In this situation, the other leaf node device may drop packets originating from the host device. But without mobility of host devices, it may be difficult to achieve a virtualized of data center solution.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
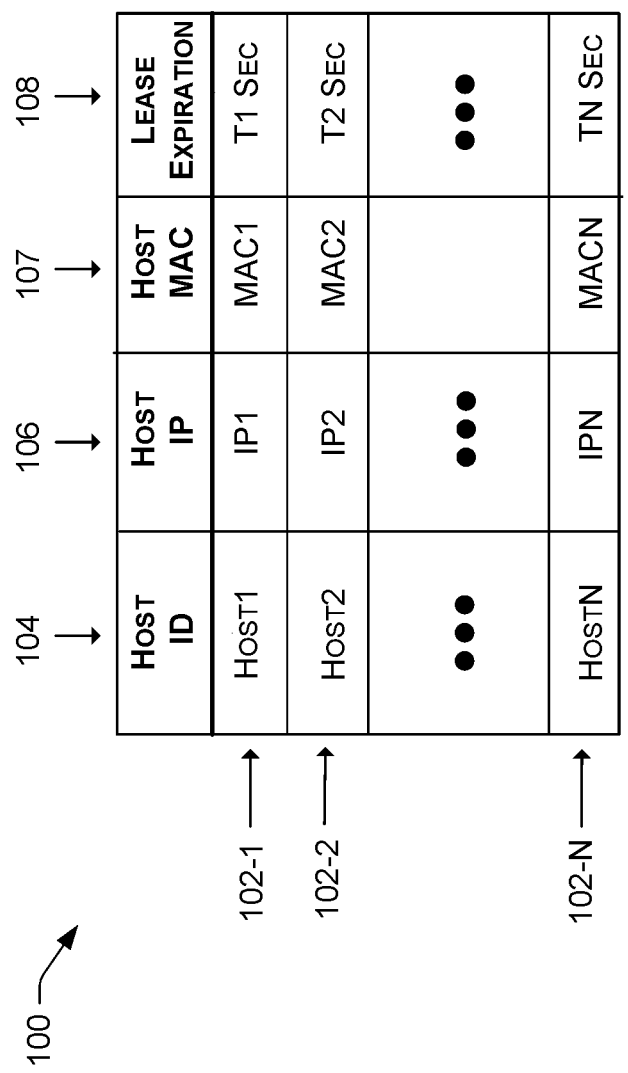
FIG. 1 illustrates an example DHCP snoop database that may be maintained in a leaf node device of a switch fabric.

This disclosure describes methods of operating a leaf node device, such as a switch device, connected to a switch fabric of a network. The leaf node device receives, from another leaf node device via the switch fabric, an indication of a secure route to a host device. In response to receiving the indication of the secure route, the leaf node device creates or updates a routing entry for the host device in a routing information base of the leaf node device and creates or updates an entry for the host device in a Dynamic Host Configuration Protocol (DHCP) snoop database of the leaf node device.

Additionally, the techniques described herein may be performed by a system and/or device having non-transitory computer-readable media storing computer-executable instructions that, when executed by one or more processors, performs the methods described herein.

EXAMPLE EMBODIMENTS

The described methods are usable, for example, to maintain first hop security in a switch fabric across multiple leaf node devices in the switch fabric. A leaf node device may distribute an indication of a secure route, to a host device, to the multiple leaf node devices of the switch fabric. Based on receiving the indication of a secure route to a host device, another leaf node device can create or update an entry for the host device in the DHCP snoop database of the other leaf node device. In this way, each leaf node device may have, in its respective DHCP snoop database, not only entries for host devices currently connected to it, but also entries for host devices that may move to it in the future.

A leaf node device in a switch fabric may create or update a DHCP snoop database of the leaf node device as a result of snooping on secure DHCP messages between one or more host devices connected to the leaf node device and a DHCP server. More particularly, the leaf node device in the switch fabric creates or updates entries in a DHCP snoop database with validated IP-to-MAC pairings observed in secure DHCP messages, between one or more host devices and a DHCP server, which the leaf node device snoops. Security applications, like Dynamic ARP Inspection (DAI) and IP Source Guard, executing on a leaf node device may use validated IP-to-MAC pairings in a DHCP snoop database of the leaf node device to validate packets that originate from host devices connected to the leaf node device and that contain the same IP-to-MAC pairing, even for host devices that have moved to the leaf node device from another leaf node device.

Dynamic ARP inspection (DAI) is a method to reject invalid and malicious address resolution protocol (ARP) packets. DAI may prevent a class of man-in-the-middle attacks in which a malicious node intercepts traffic for other nodes by poisoning the ARP caches of neighboring nodes. DAI may use a DHCP snoop database to validate received ARP messages, by determining if the IP-to-MAC pairing in a received ARP message is indicated in the DHCP snoop database as corresponding to a secure route.

IP Source Guard is a security feature that restricts IP traffic on untrusted Layer 2 ports by filtering traffic based on the DHCP snoop database. This feature helps prevent IP spoofing attacks when a host device tries to spoof and use the IP address of another host device. Any IP traffic coming into the interface with a source IP address other than that assigned (via DHCP) will be filtered out on the untrusted Layer 2 ports. That is, IP Source Guard may determine if an IP-to-MAC paring in a packet received for forwarding is indicated in the DHCP snoop database as corresponding to a secure route.

DAI and IP Source Guard are examples of security features that may execute on a leaf node device and use DHCP snoop database entries populated using information provided from another leaf node device, based on DHCP snooping by the other leaf node device, to validate traffic from a host device. This is even for a host device that has moved to the leaf node device from the other leaf node device. There are other examples of security features that may execute on a leaf node device and use information provided from another leaf node device to validate traffic from a host device connected to the leaf node device.

While DHCP snoop databases are widely deployed on centralized access switch devices, it is useful to extend the use of DHCP snoop databases to deployments that support distributed access with host device mobility. One such distributed access technology that is commonly used in datacenters is the Distributed Anycast Gateway using an Ethernet VPN (EVPN) overlay. With a distributed access deployment, the information in DHCP snoop database entries may be distributed to remote access switch devices, such that host device mobility to different remote access switch devices may be done securely. A mechanism that distributes the information for DHCP snoop database entries at multiple leaf node devices in a switch fabric may use an EVPN routing mechanism to distribute the information for the DHCP snoop database entries.

By distributing the DHCP snoop database entries, a switch device to which a host device moves may enable secure traffic to and/or from that host device even before the host device otherwise communicates with or through the switch device to make the switch device aware that the host device is connected to the switch device. For example, if a host device makes an ARP request at a switch device to which the host device moves, the ARP request may not be rejected by the switch device, since an entry for the host device may have already been created and/or updated in a DHCP snoop database of the switch device to which the host device moves. DAI at the switch device to which the host device moves may access a snoop database entry in the DHCP snoop database of the switch device to validate the ARP request. As another example, data traffic originating from the host device may not be rejected by the switch device to which the host device moves, since an entry for the host device may have already been created and/or updated in a DHCP snoop database of the switch device to which the host device moves. IP Source Guard at the switch device to which the host device moves may access the snoop database entry to validate the data traffic originating from the host device.

The DHCP snoop information communicated from a leaf node device to other leaf node devices may include not only an indication of an IP-to-MAC pairing for a host device, but it may also include an indication that a route to the host device using the IP-to-MAC pairing is secure.

In addition, DHCP lease expiration times may be distributed as well, which provides an indication to a receiving leaf node device of how long a particular IP-to-MAC pairing is considered to be valid. Lease expiration times may be extended as a result of a host device making a DHCP lease extension request to the DHCP server. A host device may automatically attempt to renew its DHCP lease as soon as some specified percentage (such as fifty percent) of the lease duration has expired, as indicated by the lease expiration time in the DHCP snoop database entry of the leaf node device to which the host device is connected.

A DHCP lease expiration time, also usable by a leaf node device to which a host device may move, may be distributed to the leaf node device, such as by using a Border Gateway Protocol (BGP) Extended Community Attribute to carry the DHCP lease expiration time. A BGP Extended Community is a group of devices that share a common property, such as leaf node devices that are members of the same overlay in which host devices may move from one leave device to another. A BGP Extended Community Attribute provides a mechanism for labeling information carried using BGP in a BGP Extended Community. See, for example, RFC 4360 (BGP Extended Community Attribute, dated February 2006). This BGP Extended Community Attribute may be sent with IP-to-MAC pairing route advertisement. The expiration time represents the time after which the host device would renew the DHCP Lease. Thus, for example, when the IP-to-MAC pairing is received by the remote BGP peer leaf node device, the remote BGP peer leaf node device may download the IP-to-MAC pairing to a local Layer-2 Routing Information Base (RIB) of the remote leaf node device, and the RIB may use this information to create or update an entry for the IP-to-MAC pairing in the DHCP snoop database for the remote leaf node device.

The DHCP lease expiration time may be provided as an absolute time (e.g., Unix time) or as a relative time. The reason is that in certain cases, like BGP peer reload or a Route-Refresh request from a peer, BGP might have to resend the routes. If the DHCP Lease Expiration is relative time, then a receiving BGP peer may interpret the Lease Expiration to happen the same as when it received the BGP update earlier.

In some examples, a leaf node device snoops on DHCP messages that are communicated between a DHCP server and a host device attached to that leaf node device. As a result of snooping on the DHCP messages, the leaf node device may learn an IP-to-MAC pairing for the host device, which the leaf node device may use to create or update an entry for the host device in a DHCP snoop database of the leaf node device. Furthermore, the leaf node device may provide an indication of the IP-to-MAC pairing to other leaf node devices to which the host device may move. A leaf node device to which the host device may move may, as a result of receiving the indication of the IP-to-MAC pairing, create or update an entry for the host device in a DHCP snoop database of the leaf node device to which the host device may move.

For example, the DHCP messages may include DHCP messages in which a DHCP server responds to a DHCP request from a host device for an IP-to-MAC pairing. The DHCP messages may also include, for example, a field which indicates renewal of a lease (IP-to-MAC pairing) for the host device. The leaf node device may snoop on these messages to glean information from which to update and/or create entries in the DHCP snoop database of the leaf node device, as well as for the leaf node device to provide to one or more other leaf node devices, so those other leaf node devices may also update and/or create entries in the DHCP snoop databases of those other leaf node devices. In this way, another leaf node device can handle traffic for the host device if/when the host device moves to the other leaf node device.

In some examples, a host device may arrive at a leaf node device from another leaf node device before the IP-to-MAC pairing has arrived at the leaf node device from the other leaf node device. Furthermore, the host device may generate an ARP prior to the IP-to-MAC pairing having arrived at the leaf node device. When the leaf node device processes the ARP but does not have an entry for the host device IP-to-MAC pairing, the leaf node device may cache the ARP, generated by the host device, for some period of time, to allow time for the IP-to-MAC pairing for the host device to arrive at the leaf node device and for the leaf node device to create a DHCP snoop database entry for the host device. The leaf node device may check the DHCP snoop database, of the leaf node device, for the IP-to-MAC pairing some time later and keep the ARP if the IP-to-MAC pairing is found. Otherwise, the leaf node device may drop the ARP.

The techniques described herein may be performed by a system and/or device having non-transitory computer-readable media storing computer-executable instructions that, when executed by one or more processors, performs the methods described herein.

FIG. 1 illustrates an example DHCP snoop database 100 that may be maintained in a leaf node device of a switch fabric. The DHCP snoop database 100 may be used by a leaf node device to verify that a particular IP-to-MAC pairing in a packet passing through the leaf node device is an actual pairing that corresponds to a secure route. For example, the leaf node device may use the DHCP snoop database 100 in the process of DAI to reject invalid and malicious ARP messages. As another example, the leaf node device may use the DHCP snoop database 100 in an IP Source Guard processing, to determine if an IP-to-MAC paring in a packet received for forwarding is indicated in the DHCP snoop database as corresponding to a secure route.

Referring still to FIG. 1, the example DHCP snoop database 100 includes rows 102-1 and 102-2, up to row 102-N. Each row 102 of the example DHCP snoop database 100 corresponds to an entry for a different IP-to-MAC pairing that has been snooped by the leaf node device, or by another leaf node device, from DHCP messages communicated between a DHCP server and a host device connected to the leaf node device or to another leaf node device. That is, the example DHCP snoop database 100 may include a row for each leaf node device in a particular domain among which host devices may move, such as a particular virtual local area network (VLAN) domain of BGP peer leaf node devices.

The DHCP server is a network server that automatically provides and assigns IP addresses, default gateways and other network parameters to client (host device) devices. The DHCP server utilizes the standard DHCP protocol to respond to queries by host devices. See, for example, RFC 2131 (Dynamic Host Configuration Protocol, dated March 1997).

The example DHCP snoop database 100 includes a column 104. The column 104 holds, for each row 102, a unique Host-ID of a host device that has requested an IP-to-MAC pairing from a DHCP server, whether a host device attached to the leaf node device with which the example DHCP snoop database is associated or attached to another leaf node device, other than the leaf node device with which the example DHCP snoop database is associated. The Host Name option is defined in RFC 2132 (DHCP Options and BOOTP Vendor Extensions, dated March 1997) with option code 12. Depending on implementations, the option value can carry either a fully qualified domain name or a simple host device name. In some examples, the Host-ID and the MAC address of the host device may be the same.

The example DHCP snoop database 100 also includes a column 106 that holds an IP address and a column 107 that holds a MAC address to which the IP address in column 106, provided by a DHCP server, is paired. The IP-to-MAC pairing for a host device may be provided by a DHCP server, for example, in response to a DHCP query from the host device. The IP-to-MAC pairing is an indication of an IP address allocated by the DHCP server and usable by other devices to reach the host device that has the MAC address indicated in the IP-to-MAC pairing.

The example DHCP snoop database 100 also includes a column 108. The column 108 holds, for each row, a time at which the IP-to-MAC pairing expires. That is, the DHCP protocol refers to the period over which an IP address is allocated to a client as a "lease." In DHCP protocol terms, the column 108 holds, for each row, the lease expiration time for the IP-to-MAC pairing. A host device may extend its lease with subsequent requests. The lease renewal time may be an absolute time or a relative time. Upon a host device extending its lease with the DHCP server, the DHCP snoop database entry for the host device, at column 108, may be updated with a new lease expiration time. While the DHCP snoop database 100 is illustrated as a table with rows and columns, this is one example organization of the DHCP snoop data, and other organizations are possible. All possible organizations of the DHCP snoop data maintained at a leaf node device may be referred to as a DHCP snoop database.

Figure 2:
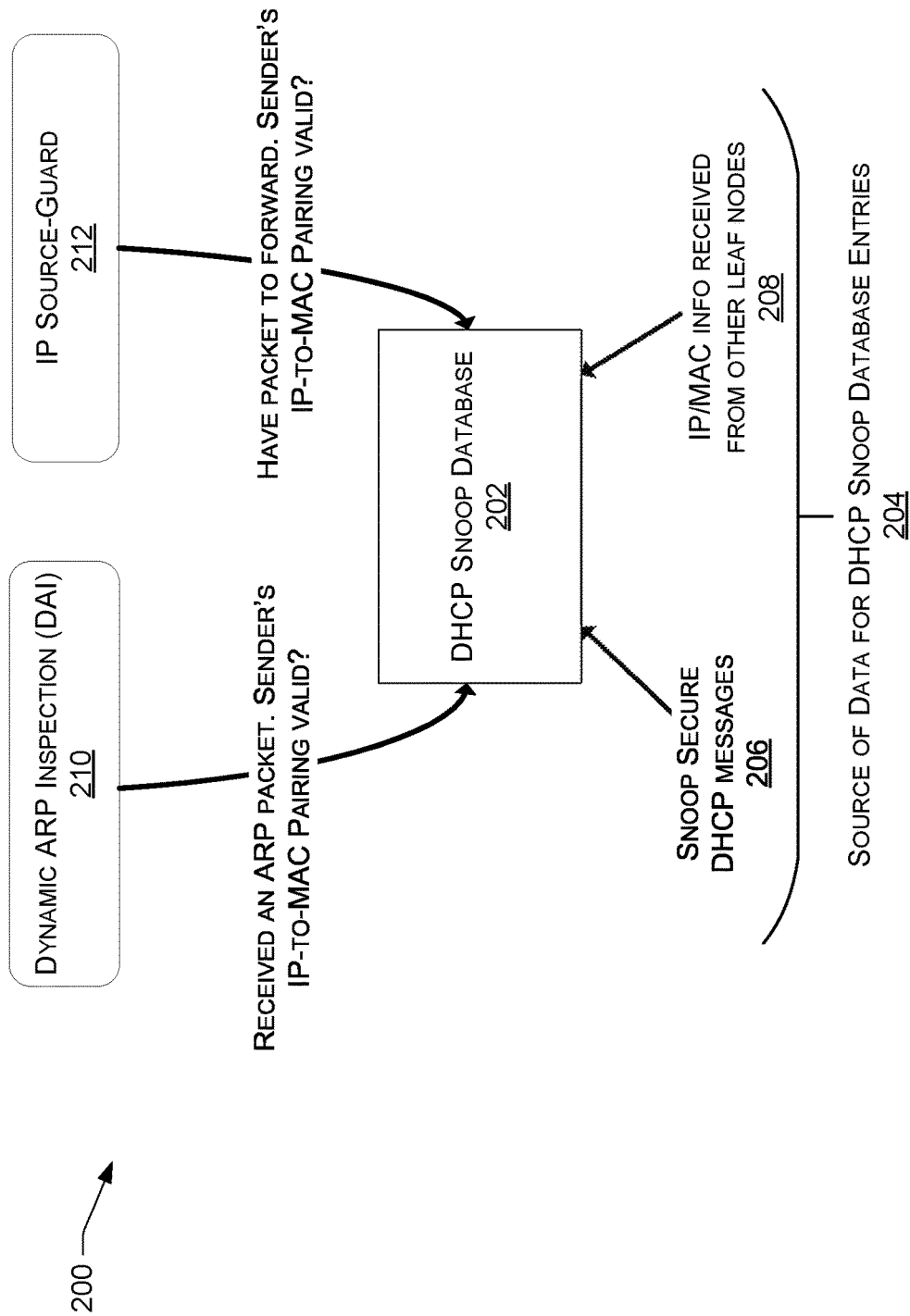
FIG. 2 schematically illustrates an example architecture showing how a DHCP snoop database associated with a particular leaf node device may be populated and utilized.

FIG. 2 schematically illustrates an example architecture 200 to show how a DHCP snoop database 202 associated with a particular leaf node device may be populated and utilized. The source of data for DHCP snoop database entries 204, for populating the snoop database 202, may originate from at least one of two different sources. One source of data for DHCP snoop database entries 204, for populating the snoop database 202 of the particular leaf node device, is DHCP snoop requests 206 made to the DHCP server from host devices attached to the particular leaf node device. For example, a host device attached to the particular leaf node device may request an IP address from the DHCP server using a request according to the DHCP protocol. The DHCP server may provide a responsive message, also according to the DHCP protocol, that includes the IP address via which other devices may reach the host device.

The particular leaf node device receives the IP-to-MAC pairing from the DHCP server in the responsive message and populates its own routing information base, which is a data table stored in the particular leaf node device that lists the routes to the host devices attached to it. The particular leaf node device also provides the IP-to-MAC paring to the DHCP snoop database of the particular leaf node device.

The particular leaf node device, in addition to providing the IP-to-MAC pairing to the DHCP snoop database of the particular leaf node device, provides the IP-to-MAC pairing to other leaf node devices to which the host device may attach. Therefore, another source of data for DHCP snoop database entries 204, for populating the snoop database 202 of the particular leaf node device, is IP-to-MAC paring information 208 that is provided from other leaf node devices. For example, the IP-to-MAC pairing information that is provided from other leaf node devices may be provided by the other leaf node devices using EVPN communications, such as in accordance with "Integrated Routing and Bridging in EVPN, draft-ietf-bess-evpn-inter-subnet-forwarding-08" dated Mar. 4, 2019. Furthermore, the other leaf node devices may also provide an indication that the IP-to-MAC pairing is secure, by setting a flag as a BGP Extended Community Attribute, indicating an authenticated DHCP entry. Upon receiving such a message, a leaf node device may create or update an entry in its DHCP snoop database 202 with an indication of the IP-to-MAC pairing and an indication that the IP-to-MAC pairing is secure. Thus, DHCP snoop pairings determined at any leaf node device are available on all leaf node devices, regardless of which leaf the DHCP snoop state was initially learned. The techniques described here by which a leaf node device provides an IP-to-MAC pairing to other leaf node devices and/or indicate an IP-to-MAC pairing is secure are examples, and other techniques may be utilized by a leaf node device to communicate IP-to-MAC pairing information to other leaf node devices.

Still referring to FIG. 2, two different functions of a leaf node device that may utilize the DHCP snoop database 202 are shown. First, the DAI 210 may utilize the entries in the DHCP snoop database 202 to determine if an IP-to-MAC pairing in a received ARP message is valid. The DAI may, for example, look in the DHCP snoop database 202 for an entry that includes the IP-to-MAC paring in a received ARP message. If there is an entry in the DHCP snoop database 202 with the same IP-to-MAC pairing as in the received ARP message, and the lease expiration time in the entry has not passed, the leaf node device may process the received ARP message. Otherwise, the leaf node device may drop the received ARP message and, in some examples, may report the received ARP message as an intrusive packet.

Another function of a leaf node device that may utilize the DHCP snoop database 202 is an IP Source Guard function 212. The IP Source Guard function 212 may utilize the entries in the DHCP snoop database 202 to determine if an IP-to-MAC pairing in a packet to be forwarded by the leaf node device is valid. The IP Source Guard function 212 may, for example, look in the DHCP snoop database 202 for an entry that includes the IP-to-MAC paring in the packet to be forwarded. If there is an entry in the DHCP snoop database 202 with the same IP-to-MAC pairing as in the packet to be forwarded and the lease expiration time in the entry has not passed, the leaf node device may forward the packet. Otherwise, the leaf node device may drop the packet (and not forward it) and, in some examples, may report the packet as an intrusive packet.

As discussed above, the IP-to-MAC pairings in the DHCP snoop database 202 against which the DAI 210 and the IP Source Guard 212 functions may check may be IP-to-MAC pairings that originated from DHCP snooping carried out by another leaf node device, i.e., a leaf node device other than the leaf node device in which the DHCP snoop database 202 resides. The DAI 210 and the IP Source Guard 212 functions may check against an IP-to-MAC pairing for a host device that established the IP-to-MAC pairing, by DHCP, while the host device was attached to the other leaf node device. Functions of the leaf node device other than DAI 210 and IP Source Guard 212 may check against IP-to-MAC pairings in the DHCP snoop database 202, including IP-to-MAC pairings provided from leaf node devices other than the leaf node device in which the DHCP snoop database 202 resides. Thus, for example, a host devices that moves from one leaf node device to another may begin to communicate upon moving, before making a DHCP request (whether, for example, for an IP-to-MAC pairing or for a renewing a DHCP lease) to a DHCP server, and functions of the leaf node device that check for the validity of communications to and/or from that host device will may affirm the validity of such communications.

Figure 3:
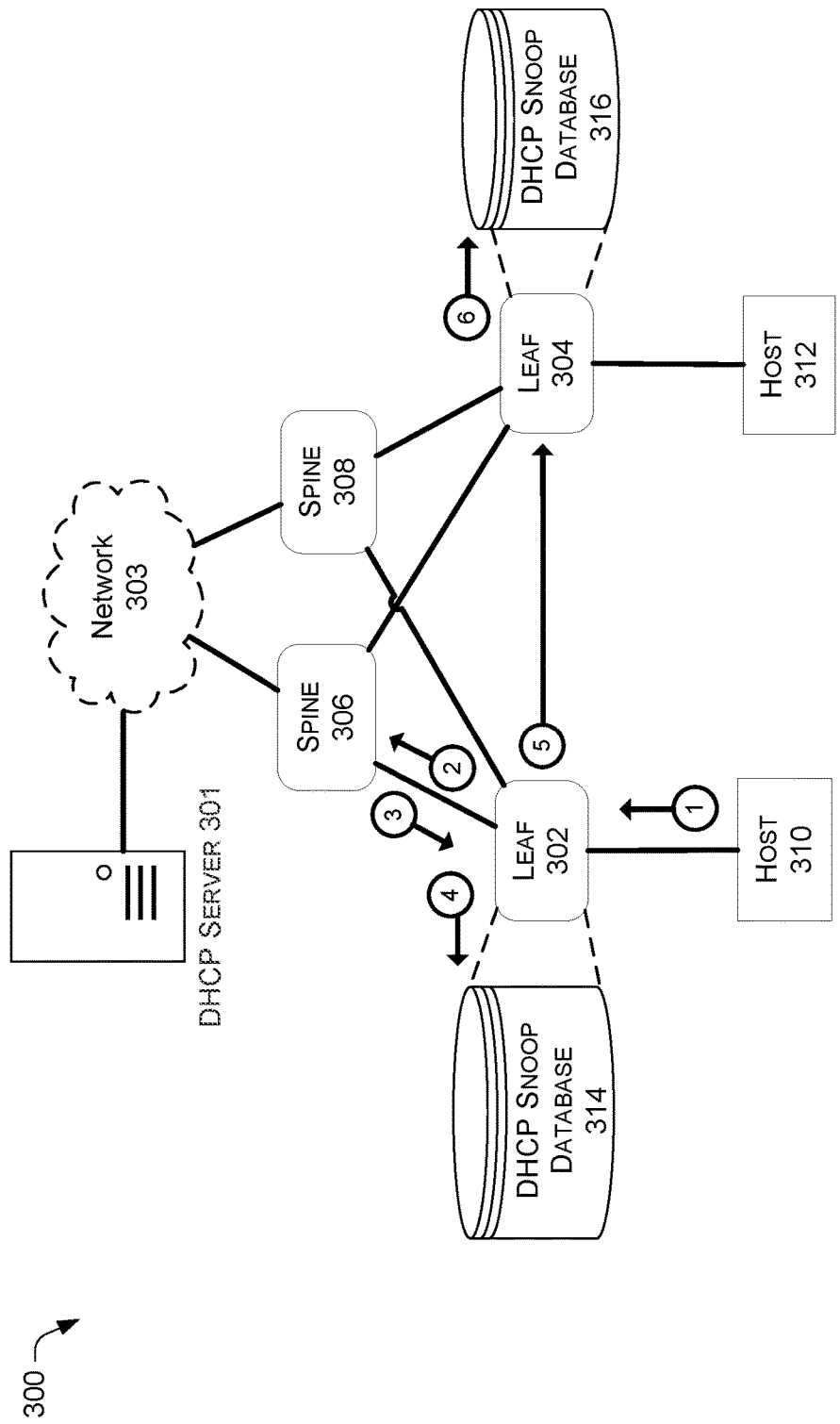
FIG. 3 schematically illustrates an example simplified system having a leaf-spine architecture and DHCP snoop database entries that are distributed among leaf node devices of the system.

FIG. 3 schematically illustrates an example simplified system 300 having a leaf-spine architecture and DHCP snoop database entries that are distributed among leaf node devices of the system 300. A leaf-spine architecture is commonly used in datacenters. For example, leaf and spine devices may form a switch fabric that is an underlay supporting an EVPN overlay.

In the FIG. 3 example simplified system 300, each leaf node device 302, 304 is connected to more than one spine device 306, 308. In this way, the underlay may provide multiple paths to each leaf node device 302, 304. In case of failure of one of the spine devices 306, 308, the other of the spine device 306, 308 may provide a backup path to each leaf node device 302, 304. The leaf node devices 302, 304 function as access devices for host devices 310, 312 that are respectively connected to the leaf node devices 302, 304. The leaf node devices 302, 304 may support both switching and routing functions and, in some examples, the leaf node devices 302, 304 may be referred to as access switch devices. The host devices 310, 312 may access a DHCP server 301 via a network 303.

Furthermore, each leaf node device 302, 304 may have an associated DHCP snoop database 314, 316. Still referring to the FIG. 3 example simplified system 300, when a host device such as host device 310 or host device 312 moves from one access switch device to another, such as host device 310 moving from leaf node device 302 to leaf node device 304 or host device 312 moving from leave device 304 to leaf node device 302, the destination leaf node device may detect the presence of a host device that has moved to it on the basis of an initial message (such as an ARP message) sent by the host device. For example, if the host device 310 moves from leaf node device 302 to leaf node device 304, leaf node device 304 may detect the presence of the host device 310 on the basis of an initial message (such as an ARP message) sent by the host device 310.

The DHCP snoop database 316 of leaf node device 304 already has an entry for the host device 310, due to information about the host device 310 being communicated to the leaf node device 304 from the leaf node device 302 when the leaf node device 302 created a DHCP snoop database entry in the DHCP snoop database 314 of the leaf node device 302. This is even though the host device 310 did not make a DHCP request while connected to leaf node device 304. DAI (such as DAI 210) of the leaf node device 304 may validate an ARP message from the host device 310. If the DHCP snoop database 316 of leaf node device 304 did not already have an entry for the host device 310, DAI (such as DAI 210) of the leaf node device 304 may not be able to validate an ARP message from the host device 310. In this instance, the host device mobility feature would be somewhat hampered, and network traffic loss may occur as a result.

Figure 4:
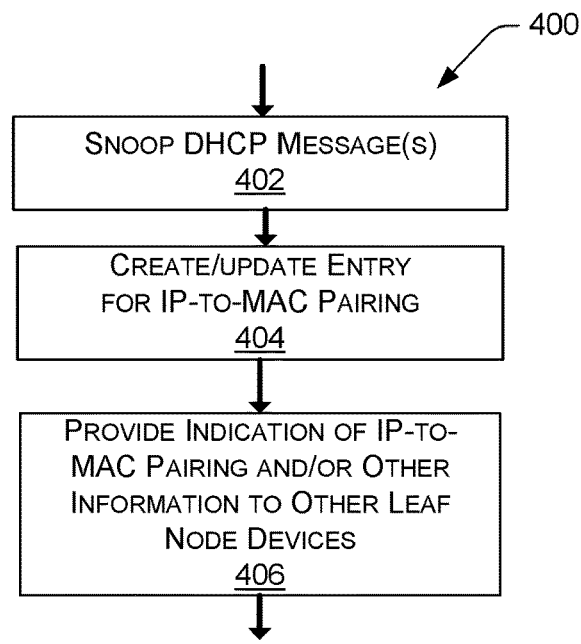
FIG. 4 is a flowchart illustrating an example process 400 at a leaf node device, when a host device attached to the leaf node device communicates with a DHCP server.

FIG. 4 is a flowchart illustrating an example process 400 at a leaf node device, when a host device attached to the leaf node device communicates with a DHCP server. At 402, the leaf node device snoops the DHCP message. For example, the host device may have just booted up or the host device may have been newly attached to the switch fabric. In such a situation, the host device may make a DHCP request to the DHCP server for an IP-to-MAC pairing. At 402, the leaf node device may snoop the DHCP message in which the DHCP server is responding to the DHCP request from the host device for the IP-to-MAC pairing. The DHCP response may include, for example, an indication of the IP-to-MAC pairing and also an indication of a time at which the IP-to-MAC pairing will expire, in the absence of a request by the host device, to the DHCP server, to renew the lease on the IP-to-MAC pairing.

As another example, the host device may have sent a request, to the DHCP server, to renew the lease on the IP-to-MAC pairing. At 402, the leaf node device may snoop the DHCP message in which the DHCP server is responding to the DHCP lease renewal request from the host device. For example, the DHCP server may respond to the DHCP lease renewal request from the host device with a new lease expiration time.

At 404, the leaf node device uses information the leaf node device snooped in a DHCP message to create or update an entry for the IP-to-MAC pairing of the host device. For example, if a DHCP snoop database entry has not been created for the host device previously, the leaf node device may create a DHCP snoop database entry for the host device. The leaf node device may include, in the DHCP snoop database entry it creates for the host device, an indication of the IP-to-MAC pairing provided from the DHCP server in the snooped DHCP message. The leaf node device may also include, in the DHCP snoop database entry it creates for the host device, an indication of the time the DHCP server indicates, in the snooped DHCP message, at which the validity of the IP-to-MAC pairing will expire.

At 406, the leaf node device provides an indication of the IP-to-MAC pairing and/or other information about IP-to-MAC pairing, such as the lease expiration time, to other leaf node devices such as other leaf node devices to which the host device may move. For example, the other leaf node devices may all be members of a same EVPN overlay as the leaf node device that provides the IP-to-MAC pairing and/or other information about the IP-to-MAC pairing. The leaf node device may be configured to send update messages, according to the EVPN protocol, for authenticated DHCP entries. For example, this authentication may be a result of obtaining the route by snooping a DHCP message. For example, the leaf node device may indicate that the route to the host device, within a message the leaf node device transmits to other leaf node devices according to the EVPN protocol, is authenticated. The indication may be, for example, using a BGP Extended Community attribute. As a result of the leaf node device using a BGP Extended Community attribute to transmit the IP-to-MAC routing, the receiving leaf node devices that are members of the same BGP Extended Community will understand the IP-to-MAC pairing to have been determined securely.

The DHCP message(s) which the leaf node device may include, for example, a message from the DHCP server in which the DHCP server indicates renewal of a lease (IP-to-MAC pairing) for the host device. The leaf node device may snoop on these messages to glean information from which to update entries in the DHCP snoop database of the leaf node device to update the lease expiration time, as well as to provide the updated lease expiration time to other leaf node devices. The leaf node device may provide the updated lease expiration time to the other leaf node devices using a BGP Extended Community attribute.

By providing IP-to-MAC pairing information for a host device, from a leaf node device to which the host device is attached, to other leaf node devices to which the host device may move, the other leaf node devices may handle traffic for the host device if/when the host device moves to one of the other leaf node devices.

Figure 5:
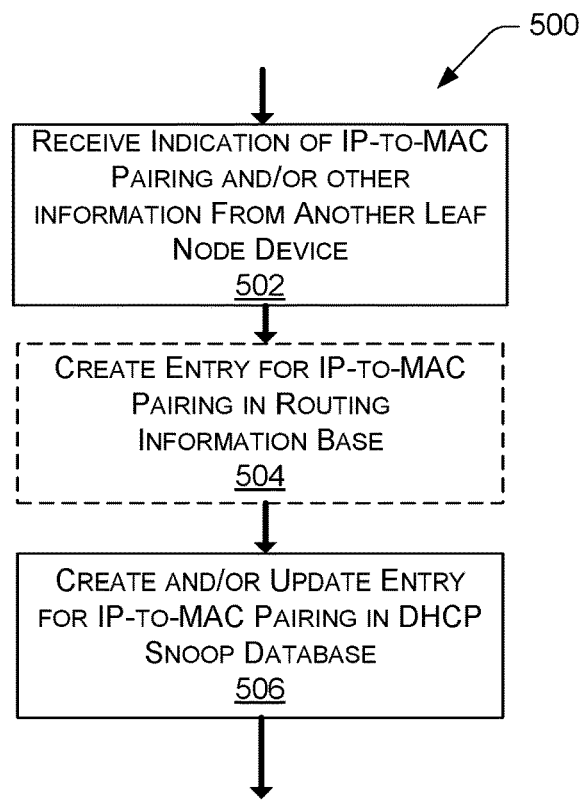
FIG. 5 is a flowchart illustrating an example process by a leaf node device when the leaf node device receives an indication of or other information about an IP-to-MAC pairing of a host device attached to another leaf node device.

FIG. 5 is a flowchart illustrating an example process by a leaf node device when the leaf node device receives an indication of or other information about an IP-to-MAC pairing of a host device attached to another leaf node device. At 502, the leaf node device receives an indication of an IP-to-MAC pairing and/or other information from another leaf node device. For example, the leaf node device and the other leaf node device, that provides the IP-to-MAC pairing and/or other information about the IP-to-MAC pairing may be members of a same EVPN overlay. The leaf node device may be configured to receive messages, according to the EVPN protocol, for authenticated DHCP entries. For example, the other leaf node device may indicate, within a message the other leaf node device transmits to the leaf node device according to the EVPN protocol, that the route to the host device is authenticated. The indication may be, for example, using a BGP Extended Community attribute.

At 504, if there is not already an entry in the routing information base of the leaf device for the IP-to-MAC pairing, the leaf device creates an entry in the routing information base of the leaf device for the IP-to-MAC pairing. The entry for the IP-to-MAC pairing created by the lead device contains at least a route to the host device having the MAC address of the IP-to-MAC pairing.

At 506, the leaf node device creates and/or updates an entry for the IP-to-MAC pairing in the DHCP snoop database of the leaf node device. The entry may be, for example, like an entry in the FIG. 3 example DHCP snoop database 300. For example, the entry may include a host device-ID for the host device with which the IP-to-MAC pairing is associated, as well as including the IP-to-MAC pairing and an indication of when the IP-to-MAC pairing will expire in the absence of a DHCP message to the DHCP server to renew the lease for the IP-to-MAC pairing. In some examples, at 506, an entry for the Host ID and/or the IP-to-MAC pairing already exists and, for example, the leaf node device may update the entry with a new lease expiration time based on the information received from the leaf node device to which the host device having the IP-to-MAC pairing is attached.

With the leaf node device having a DHCP snoop database entry for the IP-to-MAC pairing in the DHCP snoop database of the leaf node device, the leaf node device will be able to safely handle traffic for the host device having the IP-to-MAC pairing if/when the host device moves to the leaf node device.

Figure 6:
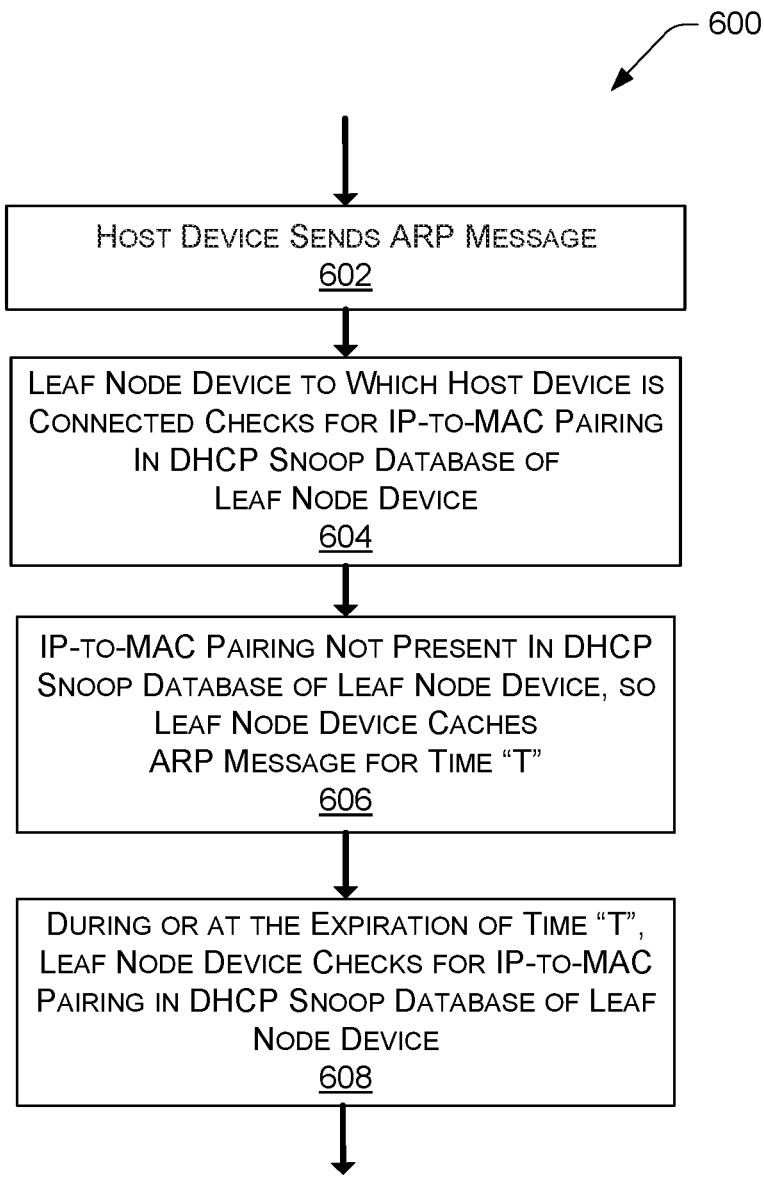
FIG. 6 is a flowchart illustrating a process at a leaf node device to handle an ARP message from a host device connected to the leaf node device, in the situation where the leaf node device does not have an IP-to-MAC pairing for the host device in the DHCP snoop database of the leaf node device.

FIG. 6 is a flowchart illustrating a process at a leaf node device to handle an ARP message from a host device connected to the leaf node device, in the race condition situation where the leaf node device does not yet have an IP-to-MAC pairing for the host device in the DHCP snoop database of the leaf node device. This situation may occur, for example, in the race condition in which the host device moved quickly to the leaf node device from another leaf node device, before the leaf node device received IP-to-MAC pairing information for the host device from the other leaf node device and/or before the leaf node device created an entry for the IP-to-MAC pairing in the DHCP snoop database of the leaf node device. Rather than drop the ARP message, the leaf node device may hold the ARP message for some time, in case the IP-to-MAC pairing for the host device may arrive at the leaf node device during that time and can be used to validate the ARP message.

Referring to FIG. 6, at 602, the host device connects to the leaf node device and sends an ARP message. At 604, the leaf node device checks for an IP-to-MAC pairing for the host device in the DHCP snoop database of the leaf node device. At 606, the leaf node device does not find the IP-to-MAC pairing for the host device in the DHCP snoop database of the leaf node device, so the leaf node device caches the ARP message for a time "T" seconds. During or at the expiration of T seconds, the leaf node device checks for the IP-to-MAC pairing in the DHCP snoop database of the leaf node device. If a DHCP snoop database entry for the IP-to-MAC pairing is created, then the leaf node device makes the ARP permanent in an ARP table of the leaf node device. Otherwise, the ARP is deleted.

By distributing the DHCP snoop database entries, a leaf node device to which a host device moves may enable secure traffic to and/or from that host device even before the host device otherwise communicates with or through the leaf node device to make the leaf node device aware that the host device is connected to the leaf node device. Thus, for example, referring back to FIG. 3, at "1", the host device 310 transmits a DHCP request to the DHCP server 301, which the leaf node device 302 provides to the DHCP server at "2". At "3", the DHCP server 301 provides the IP-to-MAC pairing back to the host device 310, via the leaf node device 302, in response to the DHCP request. The leaf node device snoops on the DHCP response and, at "4", generates or updates an entry for the host device 310 in the DHCP snoop database 314 of the leaf node device 302. At "5", the leaf node 302 provides the IP-to-MAC pairing and/or other information about the IP-to-MAC pairing, for the host device 310, to the leaf node device 304. At "6", the leaf node device 304 generates or updates an entry in the DHCP snoop database 316 of the leaf node device 304, for the host device 310.

If the host device 310 moves to leaf node device 304, then the leaf node device 304 will be able to allow traffic to and from the host device 310 based on the entry for the host device 310 in the DHCP snoop database 316 of the leaf node device 304. If the host device 310 moves to the leaf node device 304 and the leaf node device 304 does not find an IP-to-MAC pairing for the host device 310 in the DHCP snoop database 316 of the leaf node device 304 in processing an ARP message from the host device 310, then the leaf node device 304 may cache the ARP message to allow time for the IP-to-MAC pairing information to be provided for creating or updating an entry in the DHCP snoop database 316.

Figure 7:
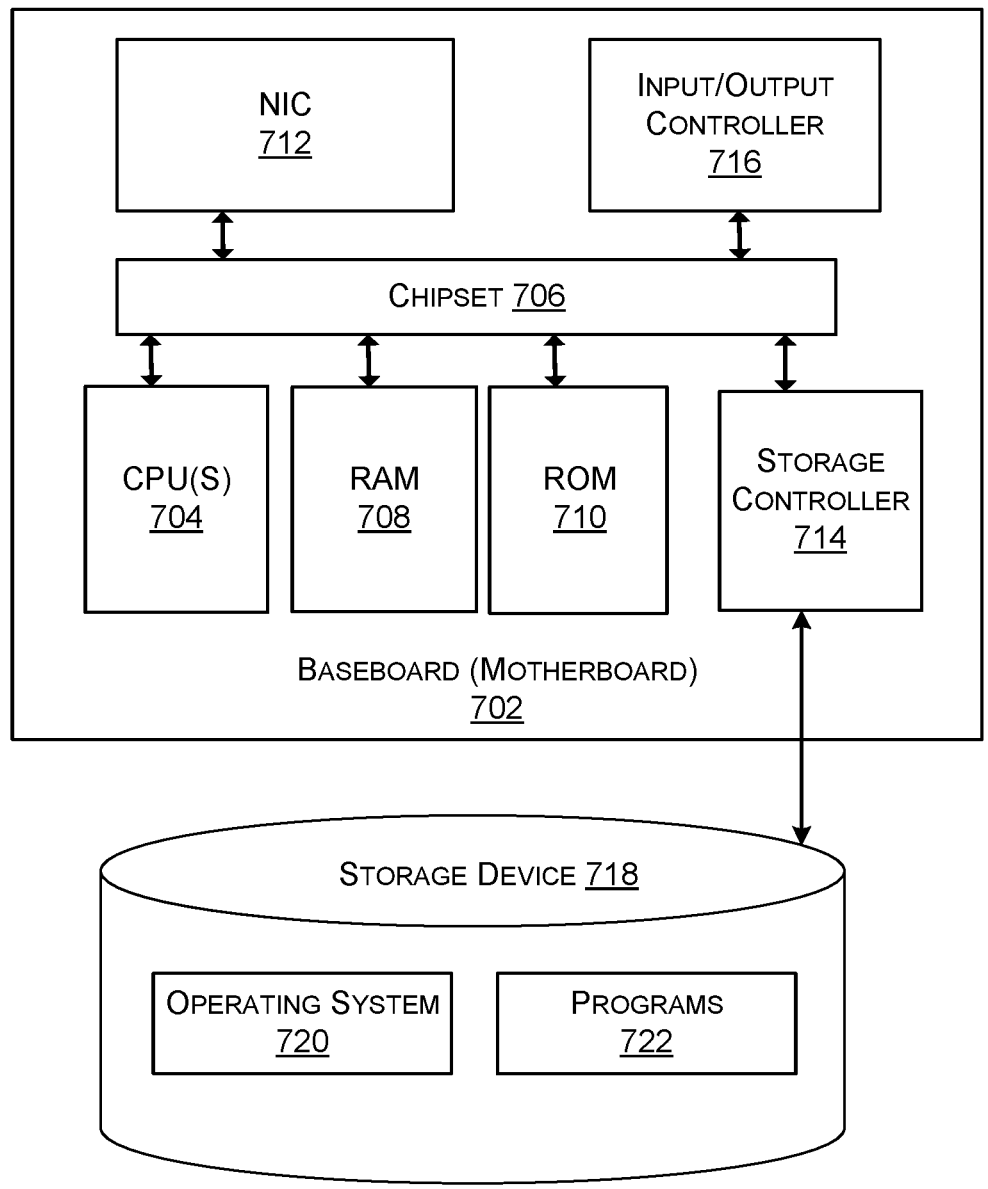
FIG. 7 illustrates an example computer architecture for a computer capable of executing program components for implementing intrusion detection functionality.

FIG. 7 illustrates an example computer architecture for a computer 700 capable of executing program components for implementing the functionality described above. The computer architecture shown in FIG. 7 illustrates an architecture of a server computer, workstation, desktop computer, laptop, tablet, network appliance, e-reader, smartphone, network switch, or other computing device, and can be utilized to execute any of the software components presented herein. The computer 700 may, in some examples, correspond to a network infrastructure device discussed herein.

The computer 700 includes a baseboard 702, or "motherboard," which may be a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be, for example, standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein. As illustrated in FIG. 7, the ROM 710 or NVRAM can also store portions of the intrusion detection rules. In other examples, the intrusion detection rules may be stored elsewhere, such as in RAM 708.

The computer 700 can operate in a networked environment using logical connections to remote computing devices and computer systems through a network. For example, the chipset 706 can include functionality for providing network connectivity through a Network Interface Controller (NIC) 712, such as a gigabit Ethernet adapter. The NIC 712 can connect the computer 700 to other computing devices over a network. It should be appreciated that multiple NICs 712 can be present in the computer 700, connecting the computer to other types of networks and remote computer systems. In some instances, the NICs 712 may include at least one ingress port and/or at least one egress port. An input/output controller 716 may be provided for other types of input/output.

The computer 700 can be connected to a storage device 718 that provides non-volatile storage for the computer. The storage device 718 can store an operating system 720, programs 722, and data, for example. The storage device 718 can be connected to the computer 700 through a storage controller 714 connected to the chipset 706. The storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like. For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data, including intrusion detection rules. It should be appreciated by those skilled in the art that computer-readable storage media is any available media that provides for the non-transitory storage of data and that can be accessed by the computer 700.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of operating a first leaf node device connected to a switch fabric, comprising:
  receiving, at the first leaf node device and from a second leaf node device, a Border Gateway Protocol (BGP) update message including an advertisement of a route from the switch fabric to a host device using an Internet Protocol (IP) to Media Access Control (MAC) pairing, wherein the first leaf node device includes a first Dynamic Host Configuration Protocol (DHCP) snoop database and the second leaf node device includes a second DHCP snoop database storing an indication that the route from the switch fabric to the host device is authenticated as secure;
  determining, at the first leaf node device, that the BGP update message includes a BGP Extended Community attribute that is populated with a value that indicates the IP-to-MAC pairing is valid and the route from the switch fabric and to the host device is authenticated as secure;
  by the first leaf node device, in response to determining that the BGP update message includes the value that indicates the IP-to-MAC pairing is valid and the route to the host device is secure, creating or updating an entry indicating the route for the host device in the first DHCP snoop database of the first leaf node device; and
  based at least in part on the entry in the first DHCP snoop database, enabling, by the first leaf node device, secure data traffic from the host device prior to the host device otherwise communicating with the first leaf node device to make the first leaf node device aware that the host device is connected to the first leaf node device.

2. The method of claim 1, further comprising:
  by the first leaf node device, determining from the first DHCP snoop database of the first leaf node device that the route to the host device is secure and, based at least in part on the determining, communicating with the host device attached to the first leaf node device.

3. The method of claim 1, wherein the switch fabric is an underlay for an Ethernet Virtual Private Network (EVPN) overlay.

4. The method of claim 1, further comprising:
  by the first leaf node device, receiving from the second leaf node device, via the switch fabric, an indication of a lease renewal time for the route, wherein creating or updating the entry for the host device in the first DHCP snoop database includes providing the lease renewal time in the entry.

5. The method of claim 1, wherein updating the entry for the host device in the first DHCP snoop database includes updating a lease expiration time for the host device in the entry.

6. The method of claim 1, further comprising:
  receiving an address resolution protocol (ARP) message from the host device;
  caching the ARP message; and
  validating the cached ARP message at least in part using the entry for the host device in the first DHCP snoop database of the first leaf node device.

7. The method of claim 1, wherein the BGP update message includes a BGP Extended Community attribute that is populated with a value that indicates the route is authenticated as secure.

8. A first leaf node device, comprising:
  one or more processors; and
  one or more non-transitory computer-readable media storing computer-executable instructions that, when executed by the one or more processors, cause the one or more processors to perform operations of:
    receiving, from a second leaf node device, via a switch fabric, a Border Gateway Protocol (BGP) update message including an advertisement of a route from the switch fabric to a host device using an Internet Protocol (IP) to Media Access Control (MAC) pairing, wherein the first leaf node device includes a first Dynamic Host Configuration Protocol (DHCP) snoop database and the second leaf node device includes a second DHCP snoop database storing an indication that the route from the switch fabric to the host device is authenticated as secure;

determining that the BGP update message includes data that indicates the IP-to-MAC pairing is valid and the route from the switch fabric and to the host device is authenticated as secure;

in response to determining that the BGP message includes the data that indicates the IP-to-MAC pairing is valid and the route to the host device is secure, creating or updating an entry indicating the route for the host device in the first DHCP snoop database of the first leaf node device; and based at least in part on the entry in the first DHCP snoop database, enabling, by the first leaf node device, secure data traffic from the host device prior to the host device otherwise communicating with the first leaf node device to make the first leaf node device aware that the host device is connected to the first leaf node device.

9. The first leaf node device of claim 8, wherein the switch fabric is an underlay for an Ethernet Virtual Private Network (EVPN) overlay.

10. The first leaf node device of claim 8, the operations further comprising:

receiving from the second leaf node device, via the switch fabric, an indication of a lease renewal time for the route, wherein creating or updating the entry for the host device in the first DHCP snoop database includes providing the lease renewal time in the entry.

11. The first leaf node device of claim 8, wherein updating the entry for the host device in the first DHCP snoop database includes updating a lease expiration time for the host device in the entry.

12. The first leaf node device of claim 11 further comprising transmitting to other leaf node devices in the switch fabric the updated lease expiration time for the host device using a BGP Extended Community attribute.

13. The first leaf node device of claim 8, the operations further comprising:

receiving an address resolution protocol (ARP) message from the host device;

caching the ARP message; and validating the cached ARP message at least in part using the entry for the host device in the first DHCP snoop database of the first leaf node device.

14. The first leaf node device of claim 8, wherein the BGP update message includes a BGP Extended Community attribute that is populated with a value that indicates the route is authenticated as secure.

15. One or more non-transitory computer-readable storage media storing computer-readable instructions that, when executed, instruct a processing unit of a first leaf node device connected to a switch fabric to perform operations comprising:

receiving, at the first leaf node device and from a second leaf node device, a Border Gateway Protocol (BGP) update message including an advertisement of a route from the switch fabric to a host device using an Internet Protocol (IP) to Media Access Control (MAC) pairing, wherein the first leaf node device includes a first Dynamic Host Protocol Configuration (DHCP) snoop database and the second leaf node device includes a second DHCP snoop database storing an indication that the route from the switch fabric to the host device is authenticated as secure;

determining, at the first leaf node device, that the BGP update message includes data that indicates the IP-to-MAC pairing is valid and the route from the switch fabric and to the host device is authenticated as secure;

in response to determining that the BGP update message includes the data that indicates the IP-to-MAC pairing is valid and the route to the host device is secure, creating or updating an entry indicating the route for the host device in the first DHCP snoop database of the first leaf node device; and based at least in part on the entry in the first DHCP snoop database, enabling, by the first leaf node device, secure data traffic from the host device prior to the host device otherwise communicating with the first leaf node device to make the first leaf node device aware that the host device is connected to the first leaf node device.

16. The one or more non-transitory computer-readable storage media of claim 15, wherein the operations further comprise:

receiving from the second leaf node device, via the switch fabric, an indication of a lease renewal time for the route, wherein creating or updating the entry for the host device in the first DHCP snoop database includes providing the lease renewal time in the entry.

17. The one or more non-transitory computer-readable storage media of claim 15, wherein updating the entry for the host device in the first DHCP snoop database includes updating a lease expiration time for the host device in the entry.

18. The one or more non-transitory computer-readable storage media of claim 15, the operations further comprising:

receiving an address resolution protocol (ARP) message from the host device;

caching the ARP message; and validating the cached ARP message at least in part using the entry for the host device in the first DHCP snoop database of the first leaf node device.

19. The one or more non-transitory computer-readable storage media of claim 15, wherein the switch fabric is an underlay for an Ethernet Virtual Private Network (EVPN) overlay.

20. The one or more non-transitory computer-readable storage media of claim 15, wherein the BGP update message includes a BGP Extended Community attribute that is populated with a value that indicates the route is authenticated as secure.

* * * * *